W. H. WILKEY.
DUST COLLECTOR.
APPLICATION FILED MAY 17, 1911.

1,088,952.

Patented Mar. 3, 1914.
3 SHEETS—SHEET 1.

Witnesses:
J. C. Turner
H. J. Gettins

Inventor
William H. Wilkey
By Lynch & Dorer
his Attorneys

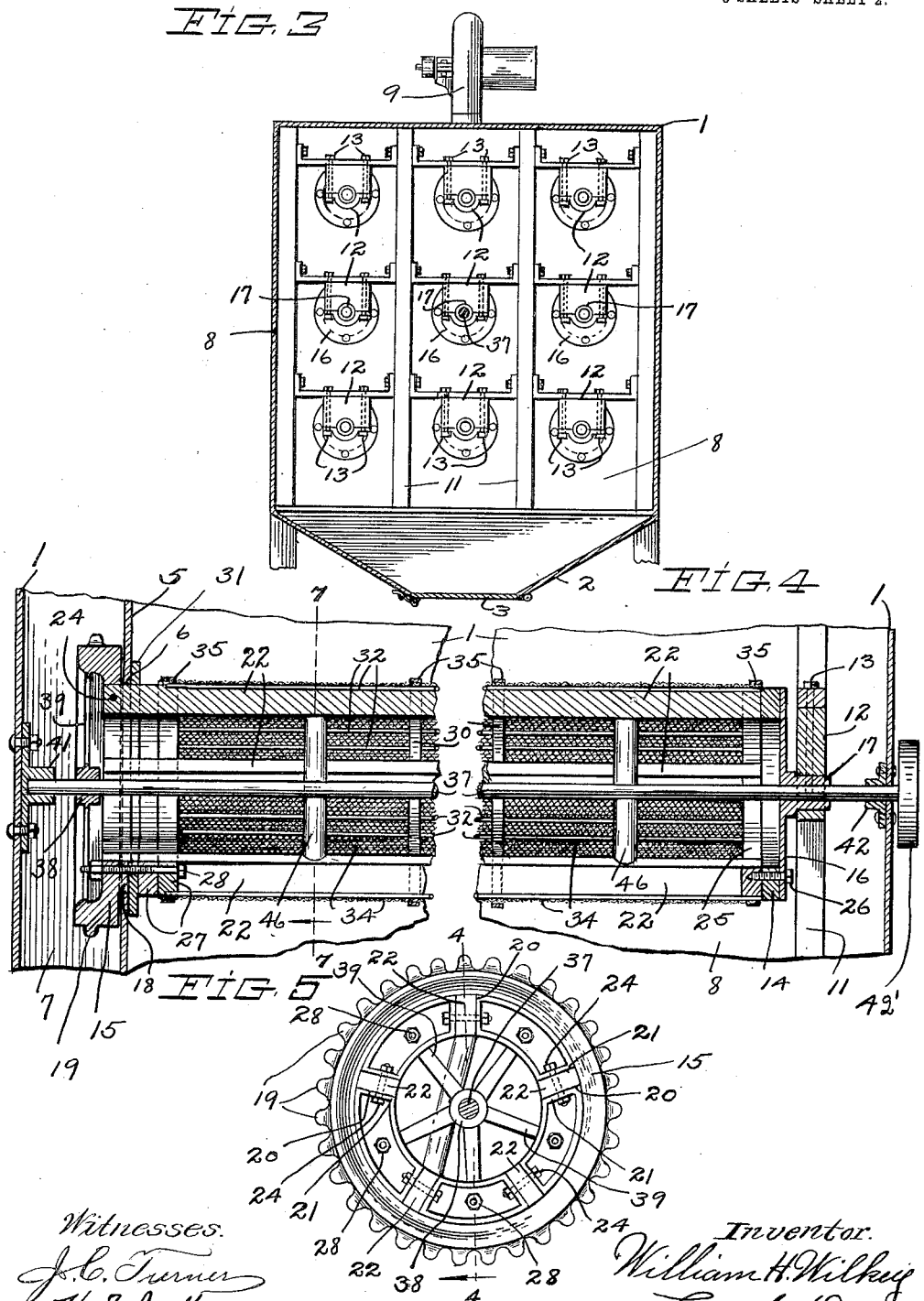

W. H. WILKEY.
DUST COLLECTOR.
APPLICATION FILED MAY 17, 1911.

1,088,952.

Patented Mar. 3, 1914.
3 SHEETS—SHEET 3.

Witnesses.
J. C. Turner
H. J. Gettins

Inventor.
William H. Wilkey
by Lynch & Dorer
his Attorneys.

UNITED STATES PATENT OFFICE.

WILLIAM H. WILKEY, OF CLEVELAND, OHIO.

DUST-COLLECTOR.

1,088,952. Specification of Letters Patent. Patented Mar. 3, 1914.

Application filed May 17, 1911. Serial No. 627,791.

*To all whom it may concern:*

Be it known that I, WILLIAM H. WILKEY, a citizen of the United States of America, residing at Cleveland, in the county of Cuyahoga and State of Ohio, have invented certain new and useful Improvements in Dust-Collectors; and I hereby declare the following to be a full, clear, and exact description of the invention, such as will enable others skilled in the art to which it pertains to make and use the same.

This invention relates to new and useful improvements in dust collectors.

The object of this invention is to provide a dust collector which will thoroughly separate the dust from the air leaving the air pure and wholesome after passing through the collector.

A further object of my invention is to provide a dust collector which will be very compact, which will have a large capacity in proportion to its size and which will also have such an arrangement of parts that the screening material can be readily repaired or renewed as necessitated without delaying the operation of the machine to any great extent.

My invention also consists in the features of construction and combination of parts described in the specification, pointed out in the claim and illustrated in the accompanying drawings.

Figure 1:
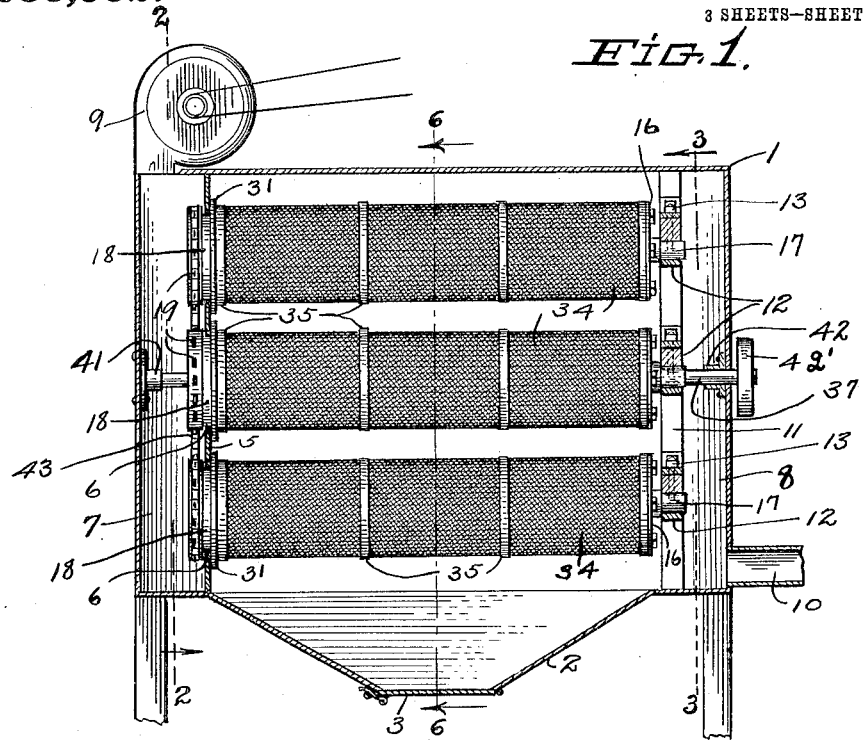
Figure 2:
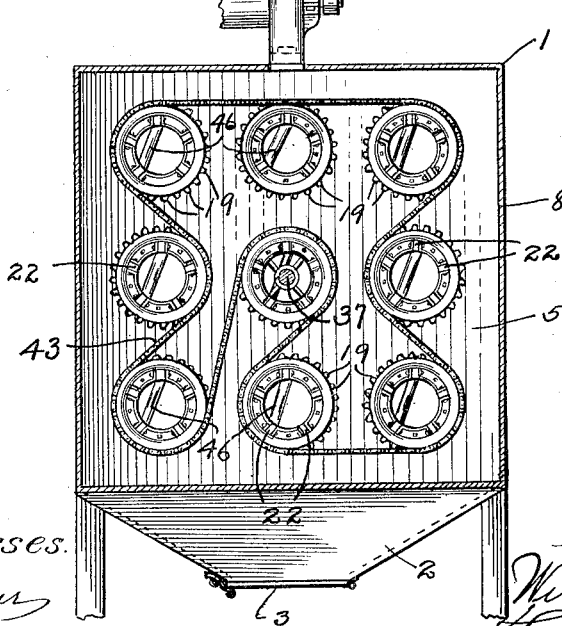
Figure 6:
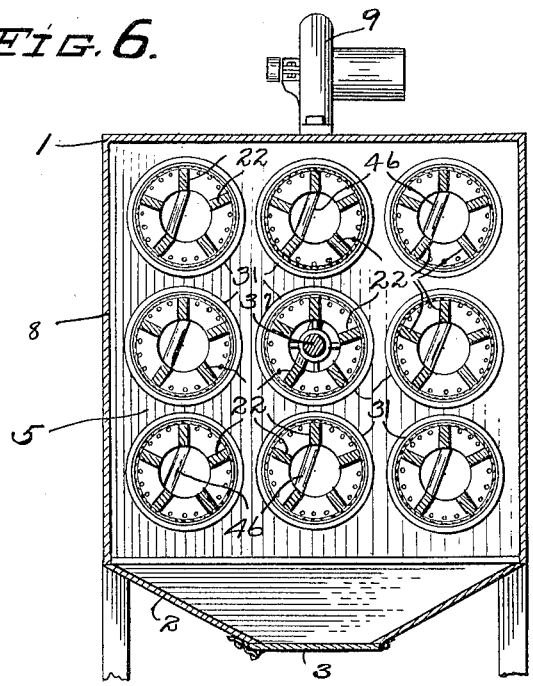
Figure 7:
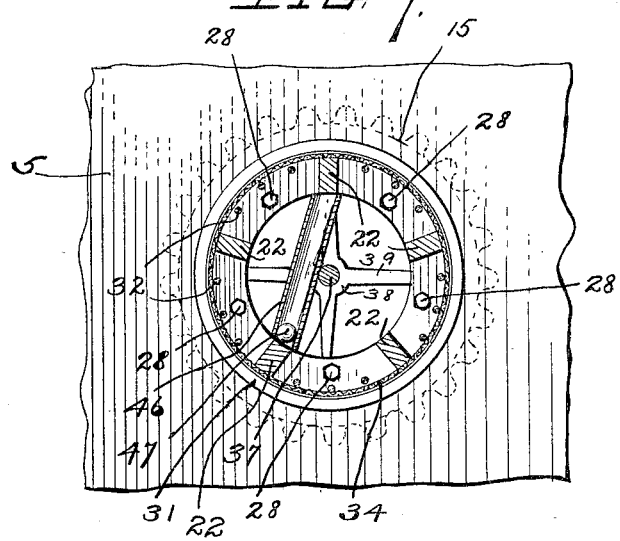

Referring to the accompanying drawings Figure 1 is a central vertical section through a dust collector embodying my invention. Fig. 2 is a section on line 2—2, Fig. 1. Fig. 3 is a section on line 3—3, Fig. 1. Fig. 4 is an enlarged section on line 4—4, Fig. 5. Fig. 5 is an enlarged detail view showing the open end of a screening cylinder. Fig. 6 is a section on line 6—6, Fig. 1. Fig. 7 is a section on line 7—7, Fig. 4.

Again referring to the drawings 1 represents an air tight casing which is made of sheet iron or similar material. The casing is provided with a hopper-shaped bottom 2 which is preferably provided with a door 3 which can be opened to remove the sand and other material from the interior of the casing. At one end of the casing 1 and extending from side to side thereof is arranged a partition 5 which is provided with nine circular openings, indicated at 6. This partition divides the interior of the casing into a suction chamber 7 and a dust collecting chamber 8 which communicate with each other only through the openings 6 in the partition 5. A suction device 9 is arranged to communicate with the suction chamber 7 at the top thereof and an inlet pipe 10 communicates with the dust collecting chamber near the bottom thereof. In the dust collecting chamber 8 at the opposite end from the partition 5 and extending from side to side thereof is arranged an open frame 11. On the open frame 11 are mounted nine bearings 12 consisting of upper and lower members which are secured to each other and to the frame 11 by bolts 13 and the centers of said bearings are in line with the centers of the openings 6 in the partition 5.

Within the dust collecting chamber 8 are arranged the screening members which are cylindrical in shape and in the construction illustrated nine such members are utilized. The said screening members or cylinders extend between the partition 5 and the open frame 11 and each screening cylinder is rotatably supported at its ends by the said partition and said frame. Each of the screening cylinders comprises a ring 14 at the end adjacent to the open frame and a ring 15 at the end adjacent to the partition. The ring 14 has secured thereto a circular plate 16 which completely closes the end of the cylinder adjacent to the frame 11 and the said plate 16 is provided with a trunnion 17 which fits into one of the bearings 12 which are hung from the open frame 11. The ring 15 at the opposite end of the screening cylinder is provided with an annular shoulder 18 which fits into one of the openings 6 in said partition 5 so that the said ring 15 is rotatably mounted in said opening. The ring 15 is also provided around its perimeter with sprocket teeth 19 and in the body portion of the ring are formed a series of radial slots 20 and at the sides of said slots 20 are formed flanges 21.

Side bars 22 extend between the rings 14 and 15 and one end of each side bar 22 is abutted against the ring 14 and the other end is fitted into one of the radial slots 20 in the ring 15 and is secured in said slot by means of a bolt 24 which passes through the end of the bar and through the flanges 21. In order to brace the said side bars 22 sector shaped bracing members 25 are arranged between the ends of the bars adjacent to the ring 14 and are secured to the said ring 14 by screws 26 and similar sector shaped bracing members 27 are arranged between the opposite ends of the bars 22 adjacent to the ring 15 and are secured thereto by screws 28. The said bracing members 27 are preferably arranged in pairs to give greater reinforcement to the cylinder at the end adjacent to the ring 15, which may be termed the driving end of the cylinder. Similar sector shaped bracing bars 30 are arranged at suitable points intermediate the ends of the cylinders. A washer 31 is preferably arranged between the ring 15 and the bracing members 27 so as to overlap the surface of the partition 5 so as to make an air tight joint where the said ring 15 extends through the partition. A series of rods 32 extend longitudinally of the cylinders and serve to support the screening material 34 which is wound around the cylinder and is secured thereon by means of bands 35. A longitudinally extending shaft is mounted centrally in one of the screening cylinders, preferably the central one, as shown at 37, and one end of said shaft 37 extends through the trunnion 17 and the other end of said shaft extends through a mounting 38 supported by a spider 39 preferably formed integral with the ring 15 and the said shaft 37 is keyed in said mounting 38. The end of the shaft adjacent to the ring 15 is supported in a bearing 41 formed or arranged on the inner surface of the casing and the other end of said shaft extends through a bearing 42 mounted on the opposite side of the casing and projects on the outside of said casing. On the projecting end of said shaft 37 is secured a driving pulley 42′. An endless chain 43 is arranged on all the rings 15 in engagement with the teeth thereon. Within each screening cylinder is mounted a tube 46, the tube being arranged so that each end is in contact with a bar 22. In each tube 46 is arranged a ball 47 and therefore as the cylinder is rotated the ball will move from end to end of the tube and at each end of the tube will strike against one of the bars 22 causing the whole cylinder to shake or vibrate.

The operation of the machine is as follows: The intake pipe 10 is connected with the room or chamber from which the dust is to be drawn and the fan 9 is then started in operation. The dust laden air is sucked into the chamber 8 of the dust collector and the suction of the fan draws the air through the screening material on the screen cylinders and then out through the open ends of the screening cylinders into the chamber 7 and from thence through the fan to the open air. As the air is drawn through the screening cylinders the dust will be caught and retained on the outer surface of the screening material. While the fan is being operated the shaft 37 is also driven by means of a suitable motor, not shown, operatively connected with the pulley 42′ and the rotation of said shaft causes a rotation of the screening cylinder in which said shaft 37 is mounted and the rotation of this cylinder drives all the other cylinders through the chain 43 which connects all the sprocket wheels on the said cylinders and as the said cylinders are rotated the balls 47 in the tubes 46 travel from end to end of the tubes striking the sides of the cylinders and producing a vibration which shakes the dust from the screening material preventing it from being clogged. Also the rotation of the cylinders prevents the dust from settling on any particular portions of the cylinders which might by the weight thereof tend to break the screening material.

What I claim is,—

A dust collector comprising a casing having a partition dividing said casing into a dust collecting chamber and a suction chamber, said partition being provided with a series of journal forming openings, bearings arranged in the dust collecting chamber, one bearing being opposite each opening in the said partition, a series of screening cylinders arranged in said dust collecting chamber, each cylinder having an open end and a closed end, the open end of each cylinder being rotatably mounted in a journal forming opening in said partition so that the end thereof extends into the suction chamber and the closed end of each cylinder being mounted in a bearing in the dust collecting chamber, gear teeth formed on the end of each cylinder where it projects through the said partition into the suction chamber and means for driving said gears so as to rotate said cylinders.

In testimony whereof, I sign the foregoing specification, in the presence of two witnesses.

WILLIAM H. WILKEY.

Witnesses:
 VICTOR C. LYNCH,
 N. L. McDONNELL.

---

Copies of this patent may be obtained for five cents each, by addressing the "Commissioner of Patents, Washington, D. C."